United States Patent
Bühler et al.

(10) Patent No.: US 8,138,243 B2
(45) Date of Patent: Mar. 20, 2012

(54) USE OF UV ABSORBERS IN THE PRODUCTION OF TRANSPARENT POLYAMIDE MOLDED PARTS

(75) Inventors: Friedrich Severin Bühler, Thusis (CH); Robert Meyer Zu Westram, Malix (CH)

(73) Assignee: EMS-Patent AG, Domat/EMS (CH)

( * ) Notice: Subject to any disclaimer, the term of this patent is extended or adjusted under 35 U.S.C. 154(b) by 333 days.

(21) Appl. No.: 12/122,468

(22) Filed: May 16, 2008

(65) Prior Publication Data

US 2009/0085019 A1    Apr. 2, 2009

Related U.S. Application Data

(60) Provisional application No. 60/956,082, filed on Aug. 15, 2007.

(30) Foreign Application Priority Data

May 16, 2007    (EP) ..................... 07108313

(51) Int. Cl.
| C08K 5/3415 | (2006.01) |
| C08K 5/101 | (2006.01) |
| C08K 5/103 | (2006.01) |
| F21V 9/04 | (2006.01) |
| G02B 5/22 | (2006.01) |

(52) U.S. Cl. .......... 524/94; 524/290; 524/317; 524/602; 252/589

(58) Field of Classification Search .................. 524/94, 524/290, 317; 252/589
See application file for complete search history.

(56) References Cited

U.S. PATENT DOCUMENTS

| 3,248,247 | A |  | 4/1966 | Heller et al. |
| 3,826,752 | A | * | 7/1974 | Rody et al. ............... 252/589 |
| 3,988,363 | A |  | 10/1976 | Spivak et al. |
| 5,500,209 | A | * | 3/1996 | Ross et al. .................. 424/66 |
| 6,441,119 | B1 |  | 8/2002 | Kosaka |
| 6,537,670 | B1 | * | 3/2003 | Sassi ........................ 428/412 |
| 6,673,888 | B2 |  | 1/2004 | Kosaka |
| 6,896,877 | B2 | * | 5/2005 | Calello et al. ............ 424/70.1 |
| 7,009,025 | B2 |  | 3/2006 | Kosaka |
| 7,133,209 | B2 | * | 11/2006 | Wursche et al. ........... 359/642 |
| 7,381,788 | B2 | * | 6/2008 | Tsujii et al. ................ 528/310 |
| 7,728,057 | B2 | * | 6/2010 | Dyllick-Brenzinger et al. ....................... 524/110 |
| 2002/0111330 | A1 | * | 8/2002 | Pinzon et al. .................. 514/54 |
| 2003/0069388 | A1 |  | 4/2003 | Lawson et al. |
| 2004/0166342 | A1 | * | 8/2004 | Wursche et al. .......... 428/474.4 |
| 2005/0158255 | A1 | * | 7/2005 | Ehlis .............................. 424/59 |
| 2006/0002875 | A1 | * | 1/2006 | Winkler et al. ................. 424/63 |
| 2006/0073106 | A1 | * | 4/2006 | Berg-Schultz et al. ......... 424/59 |
| 2006/0167138 | A1 | * | 7/2006 | Ishii et al. ..................... 523/200 |
| 2008/0247976 | A1 | * | 10/2008 | Dueva-Koganov et al. .... 424/59 |

FOREIGN PATENT DOCUMENTS

| EP | 0 610 155 A1 | 8/1994 |
| EP | 1 074 585 A1 | 2/2001 |
| JP | 2001091907 A | 4/2001 |
| JP | 3824455 B2 | 7/2006 |
| WO | 02/090421 A2 | 11/2002 |
| WO | 2005025491 A2 | 3/2005 |

OTHER PUBLICATIONS

European Search Report dated Sep. 26, 2007.

* cited by examiner

*Primary Examiner* — Tae H Yoon

(74) *Attorney, Agent, or Firm* — Browdy and Neimark, PLLC

(57) ABSTRACT

The invention relates to the use of a UV absorber in the production of transparent polyamide products or polyamide molded parts. The use according to the invention is characterized in that at least one UV absorber having at least one substituted benzoyl group is added to a polyamide molding compound, by which means melts of polyamide molding compounds comprising these UV absorbers leave no visible blooming on surfaces with which they come into contact during the production or processing of polyamide products. Particularly preferred polyamide molding compounds produced according to the use according to the invention comprise PA 6I/MXDI, PA MACM12, PA MACMI/MACMT/12 or PA 6I/6T/MACMI/MACMT/PACMI/PACMT/12 as well as one or more UV absorbers in the form of a dibenzoylmethane compound and/or an aminohydroxybenzoyl benzoic acid ester.

22 Claims, No Drawings

USE OF UV ABSORBERS IN THE PRODUCTION OF TRANSPARENT POLYAMIDE MOLDED PARTS

The invention relates to the use of a UV absorber in the production of transparent polyamide products or polyamide molded parts.

The use of UV absorbers for producing transparent plastic products having a reduced transmission for light up to a wavelength of 400 nm is known, for example, from a patent granted for the company HOYA Corp. (Tokyo, Japan) JP 382 44 55 B2, U.S. Pat. No. 6,441,119 B1, U.S. Pat. No. 6,673, 888 B2 or U.S. Pat. No. 7,009,025 B2. These patents had the object of providing UV protection which substantially absorbs all UV radiation up to a wavelength of about 400 nm. At the same time, the yellow index must be as low as possible. In this context, various monomers (diethyleneglycol bisallyl carbonate, (thio)urethane, thiirene or episulfide) were used for producing optical lenses. A dibenzoyl methane compound was used as a UV absorber, this UV absorber being added to one of these monomers, this mixture being poured into a mold for casting lenses and being polymerized in this mold.

The object of the present invention was, on the one hand, to provide an alternative thermoplastically processable polyamide molding compound with a UV absorber for producing transparent plastic products or molded parts, which have a reduced transmission for light up to a wavelength of 400 nm. A molded part produced using such a polyamide molding compound preferably has a low yellow index. In addition, a considerable reduction in the transmission is preferred so that high UV protection results.

This object is achieved by the features of the independent claim 1. In this case, the use of a UV absorber in the production of transparent polyamide products or polyamide molded parts is proposed, which is characterized in that at least one UV absorber having at least one substituted benzoyl group is added to a polyamide molding compound.

In connection with the present invention, "transparent plastic products" are considered to be transparent molded parts or transparent films produced from transparent polyamides or transparent mixtures thereof or transparent blends thereof with one or more partially crystalline polyamides. The light transmission (measured in accordance with ASTM 1003) is in this case at least 75%, preferably at least 85%, particularly preferably at least 90% and quite particularly preferably at least 91%, wherein the layer thickness of the measured molded parts is 2 mm and the maximum layer thickness of the measured films is 800 µm. In general in connection with this invention, films are also designated as molded parts because these are likewise brought into their shape by means of a device or a tool, e.g. a wide slotted nozzle, cooling roller, an airknife, and/or electropinning.

The partially crystalline polyamides preferred for the present invention are selected from the group PA 6, PA46, PA49, PA410, PA411, PA412, PA413, PA414, PA415, PA416, PA418, PA436, PA 66, PA 69, PA 610, PA 611, PA 612, PA 613, PA 614, PA 615, PA 616, PA 617, PA 618, PA 66/6, PA 6/66/12, PA 6/12, PA 11, PA 12, PA 912, PA 1212, 6T/6I, MXD6, MXD6/MXDI, MXD9, MXD10, MXD11, MXD12, MXD13, MXD14, MXD15, MXD16, MXD17, MXD18, MXD36, PACM9, PACM10, PACM11, PACM12, PACM13, PACM14, PACM15, PACM16, PACM17, PACM18, PACM36, polyetheramides, polyetheresteramides, and polyesteramides or mixtures or copolymers thereof. Particularly preferred in this context are partially crystalline polyamides from the group PA 6, PA 612, PA 614, PA 6/66/12, PA 6/12, PA 11, PA 12, polyetheramide and polyetheresteramide.

The type of transparent molded parts, plastic products or polyamide products is not subject to any restrictions. The transparent polyamide products or molded parts are selected from a group comprising sun lenses, corrective lenses, non-corrective lenses, lenses for spectacles, lenses for optical devices and systems, spectacle parts, protective goggles, observation and protective windows, sights, displays, watchglasses, equipment casings, lamp covers, filters, and films.

The transparent molded parts, plastic products or polyamide products consist of at least 50 wt. % polyamide but can also contain layers or admixtures of other plastics or substances, e.g. as a functional or decorative coating.

However, when testing transparent polyamides with commercially available absorbers, it was found that the now widely used halogenated hydroxyphenylbenzotriazoles produce a strong yellow hue. The yellow index (yellow hue) increases strongly due to the addition of UV stabilizers particularly when, for example, lenses are produced by injection molding. The high processing temperatures for polyamides and the acidic and alkaline terminal groups of these polymers make it difficult to adjust a minor yellow discoloration. A polyamide which tends to exhibit discoloration during processing is therefore usually itself protected with phosphorus compounds e.g. with phosphorus-containing acids such as $H_3PO_2$, $H_3PO_3$, $H_3PO_4$ or salts thereof which should not attack the UV stabilizers used. The phosphorus compounds are used in quantities of 0.001 to 0.5 wt. %, preferably 0.01 to 0.1 wt. % relative to the polyamide. In order to incorporate the UV protection into a polyamide molding compound, the stabilizers must withstand the thermal loading during a compounding preceding the processing or during the processing itself, wherein the temperatures required for this purpose in the case of polyamides can be above 350° C. When testing transparent polyamides with commercially available UV absorbers, it was additionally found that the processing of polyamide molding compounds containing halogenated hydroxyphenylbenzotriaxoles leads to the formation of deposits in the plasticizer unit or on the tool surface. These deposits can considerably impair the surface quality of the polyamide molding and must be regularly removed manually, which results in an interruption of the production process in each case.

It was surprisingly found that UV absorbers in the form of compounds having at least one substituted benzoyl group produce no visible blooming or deposits on surfaces with which these melts of polyamide molding compounds containing these UV absorbers come in contact during the production or processing. So, on the other hand, the problem of improving the processability of polyamide molding compounds or melts of polyamide molding compounds in or on tools was resolved at the same time.

For these reasons, the use of a UV absorber in the production of transparent polyamide products or polyamide molded parts is characterized in that at least one UV absorber having at least one substituted benzoyl group is added to a polyamide molding compound, by which means melts of polyamide molding compounds comprising these UV absorbers cause no visible blooming on surfaces with which they come into contact during the production or processing of polyamide products or molded parts.

The transparent polyamide products or molded parts produced according to the invention exhibit a considerably reduced transmission for light having a wavelength of 400 nm or of 380 nm, resulting in high UV protection which is suitable for protecting persons, animals, plants, and goods of all kinds from harmful UV radiation.

Additional preferred further developments of the use according to the invention and further inventive features are obtained from the further claims.

The transparent polyamides were produced in a manner known per se and in known agitatable pressure autoclaves comprising a collection vessel and a reaction vessel:

Deionized water is placed in the collection vessel and the monomers and additives added. Multiple inertization with nitrogen gas is then carried out. While agitating, the mixture is heated to 180 to 230° C. under the pressure being established, in order to obtain a homogeneous solution. This solution is then pumped through a sieve into the reaction vessel and there heated to the desired reaction temperature of 270 to 350° C. at a maximum pressure of 30 bar. The batch is held at the reaction temperature in the pressure phase for 2 to 4 hours. In the following pressure relief phase the pressure is reduced to atmospheric pressure within 1 to 2 hours, in which case the temperature can slightly drop.

In the following degassing phase, the batch is held at atmospheric pressure for 0.5 to 1 hours at a temperature of 270 to 350° C. The polymer melt is extracted in strand form, cooled in a water bath at 15 to 80° C., and granulated. The granular material is dried for 12 hours at 80 to 120° C. under nitrogen gas to a water content of less than 0.1 wt. %.

If xylylenediamine is to be used as the monomer, the pressure is regulated at a maximum pressure of 10 bar, preferably at a maximum of 6 bar both in the collection vessel and in the reaction vessel. The relative viscosity and therefore the molar mass can be adjusted in a manner known per se, e.g. by means of monofunctional diamines or dicarboxylic acids or with the aid of difunctional diamines or dicarboxylic acids as chain regulators.

The relative viscosity (measured in 0.5 wt.-% m-cresol solution at 20° C.) of the transparent polyamide is 1.35-2.15, preferably 1.40-1.90, particularly preferably 1.45-1.85.

The glass transition temperature (DSC with a heating rate of 20° C./min) of the transparent polyamide is 100-230° C., preferably 100-200° C., particularly preferably 130-195° C.

The refractive index $n_D^{20}$ of the transparent polyamide is 1.49-1.75, preferably 1.49-1.67, particularly preferably 1.50-1.65, and quite particularly preferably 1.51-1.64.

The polyamide granules having less than 0.1 wt. % moisture are mixed with the powdery UV absorbers, an aqueous $H_3PO_2$ solution, and optionally dye pigments for about 30 minutes in a closed container by means of a so-called tumbling mixer. In this case, the UV absorbers can also be added in the form of a master batch, preferably with a transparent polyamide as carrier material.

The equipping of the polyamide granules with UV absorbers, aqueous $H_3PO_2$ solution, and optionally dye pigments can also be effected by means of compounding on a single-shaft or double-shaft extruder with a degassing device at set cylinder temperatures of 220 to 350° C. The melt is removed in strand form, cooled in a water bath at 15 to 80° C., and granulated. The granular material is dried for 12 hours at 80 to 120° C. under nitrogen to a water content of less than 0.1 wt. %. In this way, a master batch can be produced by using elevated additive concentrations.

The mixture or the compounded granular material, each having less than 0.1% moisture, can be processed by means of injection molding, injection compression molding, closure embossing or expansion embossing, or by means of extrusion to produce transparent molded parts or films. The set cylinder temperatures in this case are 220 to 350° C., the tool temperature is 20 to 140° C. The nozzle temperature during the extrusion is 160 to 330° C., preferably 240 to 310° C. The temperature of the cooling roller during the film extrusion lies between 20° C. and the glass transition temperature (Tg) of the polyamide molding compound to be processed.

Table 1 shows the polyamide materials used, which were produced at EMSCHEMIE AG (Domat/Ems, Switzerland):

| Polyamide material | Relative viscosity | Refractive index $n_D^{20}$ | Glass transition temperature | Composition mol.-% |
|---|---|---|---|---|
| MACM12 | 1.73 | 1.51 | 155 | — |
| MACMI/ MACMT/12 | 1.53 | 1.54 | 194 | 38/38/24 19.25/ 19.25/3.75/ |
| 6I/6T/MACMI/ MACMT/PACMI/ PACMT/12 | 1.72 | 1.59 | 159 | 3.75/1.35/ 1.35/2.7 |
| 6I/MXDI | 1.48 | 1.61 | 150 | 53.6/46.3 |

Table 2 shows the commercially available UV absorbers which were studied, according to classes and the representative of the class used in each case:

| UV absorber | Class | Manufacturer |
|---|---|---|
| A | Chlorinated 2-(2-hydroxyphenyl)-2H-benzotriazole | Ciba Spezialitätenchemie AG, Switzerland |
| B | Unchlorinated 2-(2-hydroxyphenyl)-2H-benzotriazole | Ciba Spezialitätenchemie AG, Switzerland |
| C | (2-hydroxyphenyl)-s-triazine | Ciba Spezialitätenchemie AG, Switzerland |
| D | Dibenzoylmethane | DSM, The Netherlands |
| E | Aminohydroxy-benzoylbenzoic acid ester | BASF AG, Germany |

| UV absorber | Representative used | Trade name | Melting point [° C.] |
|---|---|---|---|
| A | 2-(5-chloro-2H-benzotriazol-2-yl)-6-(1,1-dimethylethyl)phenol | Tinuvin 326 | 138 |
| B | 2-(2H-benzotriazol-2-yl)-4,6-bis(1-methyl-1-phenylethyl)phenol | Tinuvin 234 | 139 |
| C | 2,4-diphenyl-6-(2-hydroxy-4-hexyloxyphenyl)-s-trianzine | Tinuvin 1577 | 149 |
| D | 1-(4-methoxyphenyl)-3-(4-tert-butylphenyl)propan-1,3-dione | Parsol 1789 | 82 |
| E | 2-(4'-diethylamino-2'-hydroxybenzoyl)benzoic acid-n-hexylester | Uvinul A Plus | 54 |

Table 3 shows the master batches produced:

| | | Composition | | | |
|---|---|---|---|---|---|
| Master batch | Carrier material | Wt. % | UV absorber | Wt. % | Manufacturer |
| F | PA MACM12 | 92 | A | 8 | EMS-CHEMIE AG, Switzerland |
| G | PA MACM12 | 92 | D | 8 | EMS-CHEMIE AG, Switzerland |
| H | PA MACM12 | 92 | D B | 7 1 | EMS-CHEMIE AG, Switzerland |

Test specimens were produced for testing the UV absorbers in polyamide molding compounds. These test specimens in the form of round plates were produced on a Krauss-Maffei KM 100-380CX injection molding machine: for this purpose, the mixture or the compounded granular material, each having less than 0.1% moisture, was fed into the feed hopper of the injection molding machine and processed in a polished steel tool having 2 cavities to give round plates having dimensions of 75×2 mm. In this case, the set cylinder temperatures are between 220 and 350° C. and the tool temperature is 80° C. The injection time varies between from 0.5 to 10 s depending on the injected volume. The total cycle time is 20 to 400 s. The round plates were used in the dry state after they had been stored after the injection molding for at least 48 h at room temperature in a dry environment, i.e. over silica gel.

The test specimens in the form of round plates were tested and measured according to the following standards:
Relative viscosity:
  ISO 307
  0.5 wt. % m-cresol solution
  Temperature 20° C.
  Calculation of the relative viscosity (RV) according to $RV=t/t_0$ based on Section 11 of the standard.
Glass transition temperature (Tg)
  ISO standard 11357-1/-2
  Granules
  Differential Scanning calorimetry (DSC) was carried out at a heating rate of 20° C./min. The temperature is given for the onset.
Light transmission and haze:
  ASTM D 1003
  Round plate, thickness 2 mm, radius 37.5 mm
  Temperature 23° C.
  Haze Gard plus measuring device from Byk Gardner with CIE Lichtart C. The light transmission and the haze value are given in % of the irradiated quantity of light.
Transmission at a defined wavelength
  Round plate, thickness 2 mm, radius 37.5 mm
  Temperature 23° C.
  The transmission is determined using the Lambda 35 UV-VIS spectrometer from Perkin-Elmer at the individual wavelengths 380, 385, 400 nm according to the equation $$T=(I/I_o)\times 100$$

where $I_o$ is the intensity of the irradiated light and I is the intensity of the transmitted light.
  The Lambda 35 comprises a dual-beam device with a wavelength resolution of 0.5 nm and a wavelength range of 190 nm to 1100 nm.
Yellow Index
  ASTM D 1925
  Round plate, thickness 2 mm, radius 37.5 mm
  Temperature 23° C.
Refractive index (index of refraction)
  DIN 53491
  Round plate, thickness 2 mm, radius 37.5 mm
  Temperature 20° C.
  Refractive index $n_D^{20}$: measurement at the standard wavelength—the yellow D line of sodium—at 20° C.

With reference to the initially formulated statement of the problem, a number of conditions were compiled which should be satisfied by a polyamide molding compound produced according to the invention:
  UV protection should be provided, which absorbs UV radiation below a wavelength of 400 nm, 385 nm, or 380 nm so that the transmission of these molded parts having a thickness of 2 mm for light having a wavelength of 400 nm is less than 20%, preferably less than 10% and especially preferably less than 5% and particularly preferably less than 1%.
  The yellow index (YI), measured in accordance with ASTM D 1925 on 2 mm thick plates should be low in the original state and should not exceed the value 5, preferably the value 2.
  As few deposits as possible or as little blooming as possible should be formed during processing. The blooming in an injection mold was selected as a test, wherein the result can be transferred in principle to cool rolling to produce films.

The results obtained with reference to the test polyamide PA 6I/MXDI are shown and explained subsequently hereinafter with reference to Table 4:

|  |  | Comparative examples | | | | Examples | |
| --- | --- | --- | --- | --- | --- | --- | --- |
|  | Unit | 1 | 2 | 3 | 4 | 5 | 6 |
| Components: | | | | | | | |
| PA 6I/MXDI | Wt. % | 100.0 | 99.9 | 99.9 | 99.9 | 99.9 | 99.9 |
| UV absorber A | Wt. % | — | 0.1 | — | — | — | — |
| UV absorber B | Wt. % | — | — | 0.1 | — | — | — |
| UV absorber C | Wt. % | — | — | — | 0.1 | — | — |
| UV absorber D | Wt. % | — | — | — | — | 0.1 | — |
| UV absorber E | Wt. % | — | — | — | — | — | 0.1 |
| Tests: | | | | | | | |
| Haze | % | 0.4 | 0.6 | 0.7 | 0.7 | 0.5 | 0.6 |
| Light transmission | % | 92.1 | 91.6 | 91.4 | 91.6 | 91.8 | 91.4 |
| YI ASTM D 1925 | original | 2.3 | 3.1 | 7.2 | 2.9 | 4.9 | 4.9 |
|  | Sun test | 26.0 | 7.5 | 10.1 | 8.0 | 13.3 | 11.4 |
| Transmission | 380 nm, % | 63.0 | 0.0 | 0.0 | 6.5 | 0.0 | 0.0 |
| Transmission | 385 nm, % | 67.3 | 0.3 | 0.3 | 18.3 | 0.2 | 0.2 |
| Transmission | 400 nm, % | 74.9 | 9.9 | 10.6 | 57.5 | 3.7 | 7.4 |

Compared with the untreated test polyamide PA 6I/MXDI (Comparative example 1), the addition of 0.1 wt. % of a UV absorber to the test polyamide in each case reduces the transmission of light having a wavelength of 380, 385, and 400 nm which was measured on the test specimen. In this case, the two UV absorbers D (Example 5) and E (Example 6) gave the best results without the light transmission deteriorating appreciably. In each case, this was higher than 91%. A very good reduction in the transmission of light having a wavelength of 380, 385, and 400 nm was also achieved with the UV absorbers A (Comparative example 2) and B (Comparative example 3). In addition, it was found that the yellow index when exposing the test specimens to sunlight (sun test) deteriorated. However, for the untreated test polyamide PA 6I/MXDI the yellow index, i.e. the yellowing, increased due to the exposure to sunlight. The haze value was in order in all cases.

The results obtained with reference to the test polyamide PA MACM12 are shown and explained subsequently hereinafter with reference to Table 5:

|  | Unit | Comparative examples | | | | Examples | | |
| --- | --- | --- | --- | --- | --- | --- | --- | --- |
|  |  | 7 | 8 | 9 | 10 | 11 | 12 | 13 |
| Components: | | | | | | | | |
| PA MACM12 | Wt % | 100.0 | 99.8 | 99.8 | 99.8 | 99.8 | 99.8 | 99.8 |
| UV absorber A | Wt. % | — | 0.2 | — | 0.1 | — | — | — |
| UV absorber B | Wt. % | — | — | 0.2 | 0.1 | — | 0.05 | 0.1 |
| UV absorber D | Wt. % | — | — | — | — | 0.2 | 0.15 | 0.1 |
| Tests: | | | | | | | | |
| Haze | % | 0.4 | 0.5 | 0.6 | 0.5 | 0.6 | 0.3 | 0.4 |
| Light transmission | % | 92.3 | 91.7 | 91.7 | 91.7 | 92.0 | 92.0 | 92.0 |
| YI ASTM D 1925 | original | −2.4 | 5.9 | 5.2 | 5.2 | 0.8 | −0.7 | −0.7 |
|  | Sun test | −1.4 | 3.9 | 3.0 | 3.0 | 6.1 | 3.4 | 0.7 |
| Transmission | 380 nm, % | 82.7 | 0.1 | 0.0 | 0.0 | 0.1 | 0.0 | 0.1 |
| Transmission | 385 nm, % | 83.8 | 0.2 | 0.7 | 0.3 | 0.3 | 0.2 | 0.3 |
| Transmission | 400 nm, % | 86.2 | 3.1 | 50.3 | 22.4 | 4.0 | 8.4 | 16.8 |

Compared with the untreated test polyamide PA MACM12 (Comparative example 7), the addition of a total of 0.2 wt. % of one or two UV absorbers to the test polyamide in each case reduces the transmission of light having a wavelength of 380, 385, and 400 nm which was measured on the test specimen. In this case, the UV absorber D (Example 11) yielded a good result without the light transmission deteriorating appreciably. In each case, this was higher than 91%. A very good reduction in the transmission of light having a wavelength of 380, 385, and 400 nm was also achieved with the UV absorber A (Comparative example 8). In addition, it was found that the yellow index when exposing the test specimens to sunlight (sun test) deteriorated. However, for the untreated test polyamide PA MACM12 the yellow index, i.e. the yellowing, increased slightly due to the exposure to sunlight. It is striking that with a combination of UV absorbers B and D (Examples 12 and 13) compared with using one UV absorber D (Example 11), the haze value and the sun test result improved. However, a slightly higher (poorer) transmission of light having a wavelength of 400 nm was necessarily detected. With this test polyamide PA MACM12, this UV absorber B gives a substantially poorer result than that for the previously tested test polyamide PA 6I/MXDI.

The results obtained with reference to the test polyamide PA MACMI/MACMT/12 are shown and explained subsequently hereinafter with reference to Table 6:

Compared with the untreated test polyamide PA MACMI/MACMT/12 (Comparative example 14), the addition of 0.2 wt. % of a UV absorber to the test polyamide in each case reduces the transmission of light having a wavelength of 380, 385, and 400 nm which was measured on the test specimen. In this case, the UV absorbers D (Example 16) and E (Example 17) yielded a good result without the light transmission deteriorating appreciably. A good result was likewise achieved from the addition of a mixture of the two UV absorbers D and E (Example 18) to the polyamide molding compound. In each case, the measured light transmission was higher than 92%. A very good reduction in the transmission of light having a wavelength of 380, 385, and 400 nm was also achieved with the UV absorber A (Comparative example 15). In addition, it was found that the yellow index when exposing the test specimens to sunlight (sun test) only deteriorated with the untreated test polyamide PA MACMI/MACMT/12; the addition of a UV absorber A (Comparative example 15), D (Example 16), E (Example 17) or a mixture of the UV absorbers D and E (Example 18) even resulted in a lesser yellowing after exposure to sunlight. The haze value was in order in all cases.

The results obtained with reference to the test polyamide PA 6I/6T/MACMI/MACMT/PACMI/PACMT/12 are shown and explained subsequently hereinafter with reference to Table 7:

|  | Unit | Comparative examples | Examples | | | |
| --- | --- | --- | --- | --- | --- | --- |
|  |  | 14 | 15 | 16 | 17 | 18 |
| Components: | | | | | | |
| PA MACMI/MACMT/12 | Wt. % | 100.0 | 99.8 | 99.8 | 99.8 | 99.8 |
| UV absorber A | Wt. % | — | 0.2 | — | — | — |
| UV absorber D | Wt. % | — | — | 0.2 | — | 0.1 |
| UV absorber E | Wt. % | — | — | — | 0.2 | 0.1 |
| Tests: | | | | | | |
| Haze | % | 0.4 | 0.5 | 0.4 | 0.5 | 0.4 |
| Light transmission | % | 93.5 | 93.1 | 92.9 | 93.0 | 93.0 |
| YI ASTM D 1925 | original | 0.0 | 6.1 | 4.9 | 5.0 | 4.9 |
|  | Sun test | 2.0 | 4.3 | 3.0 | 3.2 | 3.1 |
| Transmission | 380 nm, % | 66.9 | 0.0 | 0.0 | 0.0 | 0.0 |
| Transmission | 385 nm, % | 69.3 | 0.3 | 0.2 | 0.2 | 0.2 |
| Transmission | 400 nm, % | 76.2 | 6.4 | 2.6 | 4.7 | 3.0 |

|  | Unit | Comparative examples | Examples | | | |
| --- | --- | --- | --- | --- | --- | --- |
|  |  | 19 | 20 | 21 | 22 | 23 |
| Components: | | | | | | |
| PA 6I/6T/MACMI/MACMT/PACMI/PACMT/12 | Wt. % | 100.0 | 99.8 | 99.8 | 99.8 | 99.8 |
| UV absorber A | Wt. % | — | 0.2 | — | — | — |
| UV absorber D | Wt. % | — | — | 0.2 | — | 0.1 |
| UV absorber E | Wt. % | — | — | — | 0.2 | 0.1 |
| Tests: | | | | | | |
| Haze | % | 0.4 | 0.4 | 0.4 | 0.4 | 0.4 |
| Light transmission | % | 92.5 | 92.0 | 92.0 | 92.1 | 92.0 |
| YI ASTM D 1925 | original | 0.0 | 7.2 | 5.1 | 5.6 | 5.3 |
|  | Sun test | 5.0 | 9.7 | 7.8 | 8.9 | 8.4 |
| Transmission | 380 nm, % | 67.8 | 0.0 | 0.0 | 0.0 | 0.0 |
| Transmission | 385 nm, % | 70.9 | 0.3 | 0.2 | 0.2 | 0.2 |
| Transmission | 400 nm, % | 77.7 | 6.3 | 2.8 | 4.8 | 3.4 |

Compared with the untreated test polyamide PA 6I/6T/MACMI/MACMT/PACMI/PACMT/12 (Comparative example 19), the addition of 0.2 wt. % of a UV absorber to the test polyamide in each case reduces the transmission of light having a wavelength of 380, 385, and 400 nm which was measured on the test specimen. In this case, the UV absorbers D (Example 21) and E (Example 22) yielded a good result without the light transmission deteriorating appreciably. This was higher than 92% in each case. A very good reduction in the transmission of light having a wavelength of 380, 385, and 400 nm was also achieved with a mixture of the two UV absorbers D and E (Example 23) and also with the UV absorber A (Comparative example 20). In addition, it was found that the yellow index when exposing the test specimens to sunlight (sun test) deteriorated. However, with the untreated test polyamide PA 6I/6T/MACMI/MACMT/PACMI/PACMT/12, the yellow index, i.e. the yellowing increased slightly due to the exposure to sunlight. The haze value was in order in all cases.

It can be deduced from the tests shown so far that use of the UV absorbers A, D or E in all four test polyamides leads to acceptable measured values. Now, the causing of deposits on the surfaces of the cavity of an injection mold should provide information as to which polyamide UV absorber combinations are suitable, for example, for the series production of injection-molded polyamide lenses. The number of injection molding cycles before visible deposits could be detected on these surfaces was taken as the measure.

For economic reasons these tests were discontinued after 250 injection molding cycles if no deposit was visible up till then and thus the quality of the molded parts was perfect.

The results obtained with reference to the test polyamides PA MACM12 and PA MACMI/12 are shown and explained subsequently hereinafter with reference to Table 8:

The UV absorber B caused no visible deposits even after 250 cycles; however this cannot satisfy the requirements imposed because it allows a substantially higher (poorer) transmission of light having a wavelength of 400 nm in the case of test polyamide PA MACM12 (cf. Table 5).

The UV absorber C was not submitted to the cycle test because it allows a substantially higher (poorer) transmission of light at all the measured wavelengths 380, 385, and 400 nm in the case of the test polyamide PA 6I/MXDI (cf. Table 4).

The UV absorber D showed convincing physical measured values when it was incorporated in a polyamide molding compound. This applies to all the test polyamides used PA 6I/MXDI (cf. Table 4: Example 5), PA MACM12 (cf. Table 5: Example 11), PA MACMI/MACMT/12 (cf. Table 6: Example 16) and PA 6I/6T/MACMI/MACMT/PACMI/PACMT/12 (cf. Table 7: Example 21). This UV absorber D combined with the test polyamide PA MACM12 (cf. Table 8: Example 28) also shows no visible deposits after 250 cycles. The UV absorber D thus fulfils all the requirements imposed thereupon and is a preferred UV absorber in a polyamide molding compound.

The UV absorber E showed convincing physical measured values when it was incorporated in a polyamide molding compound. This applies to all the test polyamides PA 6I/MXDI (cf. Table 4: Example 6), PA MACMI/MACMT/12 (cf. Table 6: Example 17), and PA 6I/6T/MACMI/MACMT/PACMI/PACMT/12 (cf. Table 7: Example 22) in which it was tested. This UV absorber E combined with the test polyamide PA MACM12 (cf. Table 8: Example 29) also shows no visible deposits after 250 cycles. The UV absorber E thus fulfils all the requirements imposed thereupon and is a preferred UV absorber in a polyamide molding compound. The combination of the UV absorbers D and E showed convincing physical measured values when it was incorporated in a polyamide

|  |  | Comparative examples | | | | Examples | | |
| --- | --- | --- | --- | --- | --- | --- | --- | --- |
|  | Unit | 24 | 25 | 26 | 27 | 28 | 29 | 30 |
| Components: | | | | | | | | |
| PA MACM12 | Wt. % | 99.6 | 99.6 | 99.6 | — | 99.6 | 99.6 | 99.6 |
| PA MACMI/12 | Wt. % | — | — | — | 99.6 | — | — | — |
| UV absorber A | Wt. % | 0.4 | 0.2 | — | 0.4 | — | — | — |
| UV absorber B | Wt. % | — | 0.2 | 0.4 | — | — | — | — |
| UV absorber D | Wt. % | — | — | — | — | 0.4 | — | 0.2 |
| UV absorber E | Wt. % | — | — | — | — | — | 0.4 | 0.2 |
| Tests: | | | | | | | | |
| Number of injection molding cycles before deposits are visible | | 60 | 90 | >250 | 58 | >250 | >250 | >250 |
| Haze | % | 0.9 | 0.7 | 0.6 | 0.6 | 0.7 | 0.7 | 0.7 |
| Light transmission | % | 91.4 | 91.5 | 91.6 | 91.9 | 91.8 | 91.9 | 91.9 |
| YI ASTM D 1925 | original | 12.0 | 7.1 | 6.0 | 11.3 | 1.7 | 1.9 | 1.7 |
|  | Sun test | — | — | — | — | — | — | — |
| Transmission | 380 nm, % | 0.0 | 0.0 | 0.0 | 0.0 | 0.0 | 0.0 | 0.0 |
| Transmission | 385 nm, % | — | — | — | — | 0.0 | 0.0 | 0.0 |
| Transmission | 400 nm, % | 0.6 | 3.2 | 28.0 | 0.6 | 0.3 | 0.9 | 0.6 |

The most promising UV absorbers so far for incorporating into a polyamide molding compound A, D, and E, as well as the mixture of the UV absorbers D and E showed a very different tendency to form deposits on the surface of the tool:

The co-favorite so far, UV absorber A together with the test polyamides PA MACM12 (Comparative example 24) or PA MACMI/12 (Comparative example 27) showed visible deposits after 60 and 58 injection molding cycles respectively and is thus excluded from the evaluation.

molding compound cf. Examples 23 and 30) and with the test polyamide PA MACM12 (cf. Table 8: Example 30), also shows no visible deposits after 250 cycles. The combination of UV absorbers D and E thus fulfils all the requirements imposed thereupon and is a preferred UV absorber combination in a polyamide molding compound.

The criterion of the different tendency to form deposits on the surface of the tool is substantive because such blooming appreciably detracts from the quality of the surfaces of the injection molded parts produced with these UV absorbers. The same polyamide molding compounds without these UV absorbers caused no such undesirable blooming, so that this must be uniquely attributed to the UV absorbers used.

As shown by the transmission values given in Table 8, it is entirely possible to reduce the transmission to below 1% by using 0.4 wt. % of UV absorbers A, D, E or the combination D and E.

However, when UV absorber A is used in this quantity, the yellow index increases drastically, resulting in a value of 12 (cf. Comparative example 24).

When using the UV absorbers D, E or a mixture thereof, the increase in the yellow index is far smaller, resulting in values below 2 (cf. Examples 28, 29, and 30).

A second series of tests in which master batches were used confirmed the results of the cycle test which have just been discussed. The results obtained with reference to the test polyamide used PA MACM12 are shown and explained subsequently hereinafter with reference to Table 9:

|  | Unit | Comparative example 31 | Examples 32 | Examples 33 |
|---|---|---|---|---|
| Components: | | | | |
| PA MACM12 | Wt. % | 95 | 95 | 95 |
| UV master batch F | Wt. % | 5 | — | — |
| UV master batch G | Wt. % | — | 5 | — |
| UV master batch H | Wt. % | — | — | 5 |
| Tests: | | | | |
| Number of injection molding cycles before deposits are visible | | 58 | >250 | >250 |

From UV master batch F (Comparative example 31) comprising 8% of UV absorbers A (cf. Table 3), 5 wt. % was added to the test polyamide PA MACM12. Thus, the fraction of the UV absorber A in relation to the test polyamide is 0.4 wt. %. Similarly, as shown in Table 8 (see Comparative example 24), the UV absorber A together with the test polyamide PA MACM12 on this occasion already causes visible deposits after 58 injection molding cycles.

From UV master batch G (Example 32) comprising 8% of UV absorbers D (cf. Table 3), 5 wt. % was added to the test polyamide PA MACM12. Thus, the fraction of the UV absorber D in relation to the test polyamide is 0.4 wt. %. Precisely as shown in Table 8 (see Comparative example 28), the UV absorber D combined with the test polyamide PA MACM12 (cf. Table 9; Example 32) causes no visible deposits after 250 injection molding cycles.

From UV master batch H (Example 33) comprising 7% of UV absorbers D and 1% UV absorbers B (cf. Table 3) 5 wt. % was added to the test polyamide PA MACM12. Thus, the fraction of the UV absorber mixture D/B in relation to the test polyamide is 0.4 wt. %. The presence of both UV absorbers B and D combined with the test polyamide PA MACM12 thus also causes no visible deposits after 250 cycles. This result is also of interest therefore because a similar combination of 0.05 wt. % of UV absorber B and 0.15 wt. % of UV absorber D (cf. Table 5, Example 12) yielded an improved haze value and yellow index; in this case, only one slightly inferior transmission value for light having a wavelength of 400 nm must be accepted compared with using only UV absorber D.

On the basis of the present test results, the two UV absorbers D or E are preferably added to a polyamide molding compound with which transparent plastic products having a reduced transmission for light up to a wavelength of 400 nm are to be produced. The fraction of this added UV absorber is preferably between 0.01 and 1.0 wt. %, particularly preferably between 0.05 and 0.4 wt. % relative to the weight of the polyamide molding compound.

Both UV absorbers make it possible that the melts of polyamide molding compounds comprising these absorbers cause no visible blooming on surfaces with which they come into contact.

The UV absorber D is a representative of the dibenzoylmethanes. It is particularly preferable to use 1-(4-methoxyphenyl)-3-(4-tert-butylphenyl)propane-1,3-dione.

The UV absorber E is a representative of the aminohydroxybenzoylbenzic acid esters. It is particularly preferable to use 2-(4'-diethylamino-2'-hydroxybenzoyl)benzoic acid-n-hexylester.

The two preferred UV absorbers D and E have at least one substituted benzoyl group as a common chemical feature.

It is known that avobenzone (also known under the designation dibenzoylmethane or trade names such as Parsol 1789; UV absorber D) can degrade under exposure to sunlight (see, for example, Warwick L. Morison, M.D. "Photosensitivity" *The New England Journal of Medicine*. Boston: Mar. 11, 2004. Vol. 350, Iss. 11; pg. 1111-1117). This degradation can clearly be reduced by adding the UV absorber B (cf. Table 5, Examples 12 and 13).

A further indication of possible stabilization of the UV absorber D is deduced from the next example. The results obtained with reference to the test polyamide PA MACM12 are shown and explained subsequently hereinafter with reference to Table 10:

|  | Unit | Example 34 | Example 35 |
|---|---|---|---|
| Components: | | | |
| PA MACM12 | Wt. % | 99.85 | 99.85 |
| UV absorber D | Wt. % | 0.15 | 0.15 |
| Makrolex blue RR | ppm | — | 1.4 |
| Tests: | | | |
| Haze | % | 0.5 | 0.3 |
| Light transmission | % | 92.0 | 90.8 |
| YI ASTM D 1925 | original | 0.8 | −3.7 |
|  | Sun test | 6.1 | 4.4 |
| Transmission | 380 nm, % | 0.1 | 0.0 |
| Transmission | 385 nm, % | 0.3 | 0.24 |
| Transmission | 400 nm, % | 4.9 | 4.4 |

A reduction in the UV absorber fraction from 0.2 wt. % (see Table 5: Example 11) to 0.15 wt. % (Example 34) to the test polyamide PA MACM 12 yields a slightly lower haze value and a somewhat elevated transmission value at 400 nm. However, if only 1.4 ppm of the dye Macrolex blue RR (LANXESS Deutschland GmbH, Leverkusen) is added, the haze value is again reduced. However, the light transmission is also reduced somewhat but still remains above 90%. In particular, the yellow index and the transmission value for light having a wavelength of 400 nm are significantly reduced.

It was therefore surprisingly found that polyamide molding compounds with a UV absorber in the form of a dibenzoyl methane compound or an aminohydroxybenzoyl benzoic acid ester cause no visible blooming on surfaces with which their melts of polyamide molding compounds come into contact.

UV absorbers were therefore surprisingly found which make it possible to achieve the desired properties in transparent polyamides and which can withstand both the high temperatures during the processing or compounding of the molding compound and also the acidic or alkaline terminal groups of the polyamides. Contrary to expectations caused by the low melting point, UV absorbers of the dibenzoyl methane type when incorporated in polyamides or during processing of polyamide molding compounds containing dibenzoyl methanes, do not tend to form visible deposits on plasticizer screws, nozzle lips, tool surfaces or cooling rollers. This advantage is also retained when the dibenzoyl methanes are combined with unchlorinated hydroxyphenylbenztriazoles.

When unchlorinated hydroxyphenylbenztriazoles are added to dibenzoyl methanes, the increase in the yellow index after exposure can surprisingly be reduced, as shown by Examples 12 and 13.

For these reasons, furthermore, an embodiment of the polyamide molding compound produced according to the invention is preferred, which is characterized in that it comprises a further UV absorber which is added to the at least one UV absorber. In this case, the further UV absorber is selected from a group formed from unchlorinated hydroxyphenylbenztriazoles, aminohydroxybenzoylbenzoic acid ester, and dibenzoylmethanes. Specially preferred is an unchlorinated hydroxyphenylbenztriazole in the form of 2-(2H-benzotriazol-2-yl)-4,6-bis(1-methyl-1-phenylethyl)phenol. Likewise specially preferred is an aminohydroxybenzoylbenzoic acid ester in the form of 2-(4'-diethylamino-2'-hydroxybenzoyl) benzoic acid-n-hexylester.

Another method for reducing this increase in the yellow index is the combination of dibenzoylmethanes or mixing a compound comprising at least one substituted benzoyl group with dyes in the class of anthraquinone dyes such as, for example, Macrolex blue RR or Macrolex red 5B, as shown by Example 35. In this case, the anthraquinone dyes are used in quantities of 0.1 to 1000 ppm, preferably 0.5 to 500 ppm. Optical lighteners such as Tinopal AMS GX or Tinopal DMS also achieve a reduction in the yellow index.

Preferred are transparent polyamides formed from:
   at least one diamine selected from a group consisting of ethylenediamine, butanediamine, hexamethylenediamine, trimethylhexamethylenediamine, methylpentanediamine, bis(aminocyclohexyl)methane and its alkyl derivatives, bis(aminocyclohexyl)propane and its alkyl derivatives, isophoronediamine, norbornanediamine, bis(aminomethyl)norbornane, xylylenediamine, bis(aminomethyl)cyclohexane and its alkyl derivatives; and
   at least one dicarboxylic acid selected from the group consisting of succinic acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, hexadecanedioic acid, heptadecanedioic acid, octadecanedioic acid, nonadecanedioic acid, eicosanedioic acid, japanic acid, cyclohexanedicarboxylic acid, dimeric fatty acid having 36 or 44 C atoms, isophthalic acid, terephthalic acid, naphthalenedicarboxylic acid.

Alternatively also preferred are transparent polyamides formed from the aforesaid diamines and dicarboxylic acids as well as lactams having 4 to 15 C atoms and/or $\alpha,\omega$ amino acids having 4 to 15 C atoms.

Specially preferred diamines are hexamethylenediamine, trimethylhexamethylendiamine, 2-methyl-1,5-pentanediamine, bis(4-amino-3-methylcyclohexyl)methane (MACM for short), bis(4-amino-cyclohexyl)methane (PACM for short), isophoronediamine, norbornanediamine, m-xylylenediamine and 1,3-bis(aminomethyl)cyclohexane.

Specially preferred dicarboxylic acids are adipic acid, azelaic acid, sebacic acid, 1,12-dodecanedioic acid, brassylic acid, 1,14-tetradecanedioic acid, 1,15-pentadecanedioic acid, 1,16-hexadecanedioic acid, 1,18-octadecanedioic acid, 1,3-cyclohexanedicarboxylic acid, dimeric fatty acid having 36 or 44 C atoms, isophthalic acid, terephthalic acid, and 2,6-naphthalenedicarboxylic acid.

Specially preferred lactams are lactams or $\alpha, \omega$-amino acids having 4, 6, 7, 8, 11 or 12 C atoms. These are the lactams pyrrolidin-2-one (4 C atoms), $\epsilon$-caprolactam (6 C atoms), oenanthlactam (7 C atoms), caprylic lactam (8 C atoms), laurinlactam (12 C atoms) or the $\alpha, \omega$-amino acids 1,4-aminobutanoic acid, 1,6-aminohexanoic acid, 1,7-aminoheptanoic acid, 1,8-aminooctanoic acid, 1,11-aminoundecanoic acid, and 1,12-aminododecanoic acid.

Quite specially preferred transparent polyamides having a high refractive index are PA 6I, PA 6I/6T, PA 6I/6T/6NDC, PA MXDI/6I, PA MXDI/MXDT/6I/6T, PA MXDI/12I, PA MXDI, those having a medium and lower refractive index PA MACM12, PA MACM13, PA MACM14, PA MACM15, PA MACM16, PA MACM17, PA MACM18, PA 6-3-T, PA MACMI/12, PA MACM6/12, PA MACMT/12, PA MACMI/MACMNDC, PA MACMT/MACMNDC, PA MACMI/MACM36, PA MACMT/MACM36, PA MACMI/MACMT/12, PA 6I/MACMI/12, PA 6I/6T/MACMI/MACMT, PA 6I/6T/MACMI/MACMT/12, PA 6I/6T/MACMI/MACMT/MACM12/612, PA 6I/6T/6NDC/MACMI/MACMT/MACMNDC, wherein the MACM can be completely or partially replaced by PACM and/or the $\omega$-laurolactam can be completely or partially replaced by $\epsilon$-caprolactam and/or $\alpha, \omega$-aminoundecanoic acid.

Transparent polyamides can contain one or more additives selected from the group of condensation catalysts, chain regulators, defoaming agents, stabilizers, lubricants, dyes, flame retardants, photochromic additives, antistatics, mold release agents, optical brighteners, natural layered silicates, and synthetic layered silicates.

The invention claimed is:
1. A thermoplastically processable polyamide injection or extrusion molding composition comprising
   at least one UV absorber, for avoiding deposits on production tool surfaces in the production of transparent polyamide products or molded parts,
   wherein said at least one UV absorber is selected from the group consisting of 1-(4-methoxyphenyl)-3-(4-tert-butylphenyl)propane-1,3-dione and 2-(4'-diethylamino-2'-hydroxybenzoyl)benzoic acid-n-hexylester,
   said at least one added UV absorber being present between 0.01 and 1.0 wt. % relative to the weight of the polyamide injection or extrusion molding composition,
   wherein the polyamide injection or extrusion molding composition comprises at least 50 wt. % of polyamide consisting of at least one transparent polyamide, a mixture of transparent polyamides, or a blend of transparent polyamides with at least one partially crystalline polyamide, and
   wherein the at least one transparent polyamide is formed from at least one group consisting of:
   (a) at least one diamine selected from the group consisting of ethylenediamine, butanediamine, hexamethylenediamine, trimethylhexamethylenediamine, methylpentanediamine, bis(aminocyclohexyl)methane and its alkyl derivatives, bis(aminocyclohexyl)propane and its alkyl derivatives, isophoronediamine, norbornanedi- amine, bis(aminomethyl)norbornane, xylylenediamine, bis(aminomethyl)cyclohexane and its alkyl derivatives; and (b) at least one dicarboxylic acid selected from the group consisting of succinic acid, glutaric acid, adipic acid, pimelic acid, suberic acid, azelaic acid, sebacic acid, undecanedioic acid, dodecanedioic acid, brassylic acid, tetradecanedioic acid, pentadecanedioic acid, hexadecanedioic acid, heptadecanedioic acid, octadecanedioic acid, nonadecanedioic acid, eicosanedioic acid, japanic acid, cyclohexanedicarboxylic acid, dimeric fatty acid having 36 or 44 C atoms, isophthalic acid, terephthalic acid, and naphthalenedicarboxylic acid; and (c) optionally of lactams having 4 to 15 C atoms and/or α,ω amino acids having 4 to 15 C atoms, and melts of the polyamide injection or extrusion molding material comprising said at least one UV absorber leaving no visible blooming on surfaces with which they come into contact during processing or production of transparent polyamide products or transparent polyamide molded parts.

2. The polyamide injection or extrusion molding composition according to claim 1,
wherein the at least one partially crystalline polyamide is selected from the group consisting of PA 6, PA46, PA49, PA410, PA411, PA412, PA413, PA414, PA415, PA416, PA418, PA436, PA 66, PA 69, PA 610, PA 611, PA 612, PA 613, PA 614,
PA 615, PA 616, PA 617, PA 618, PA 66/6, PA 6/66/12, PA 6/12, PA 11, PA 12, PA 912, PA 1212, PA 6T/6I, MXD6 (with MXD=metaxylylenediamine), MXD6/MXDI, MXD9, MXD10, MXD11, MXD12, MXD13, MXD14, MXD15, MXD16, MXD17, MXD18, MXD36, PACM9 (with PACM=bis(4-aminocyclohexyl)methane), PACM10, PACM11, PACM12, PACM13, PACM14, PACM15, PACM16, PACM17, PACM18, PACM36, polyetheramides, polyetheresteramides, polyesteramides, mixtures thereof and copolymers thereof.

3. The polyamide injection or extrusion molding composition according to claim 1,
wherein the diamine is selected from the group consisting of hexamethylenediamine, trimethylhexamethylenediamine, 2-methyl-1,5-pentanediamine, bis(4-amino-3-methylcyclohexyl)methane, bis(4-amino-cyclohexyl) methane, isophoronediamine, norbornanediamine, m-xylylenediamine, and 1,3-bis(aminomethyl)cyclohexane.

4. The polyamide injection or extrusion molding composition according to claim 1,
wherein the dicarboxylic acid is selected from the group consisting of adipic acid, azelaic acid sebacic acid, 1,12-dodecanedioic acid, brassylic acid,
1,14-tetradecanedioic acid, 1,15-pentadecanedioic acid,
1,16-hexa decanedioic acid, 1,18-octadecanedioic acid,
1,3-cyclohexanedicarboxylic acid, 1,4-cyclohexanedicarboxylic acid, dimeric fatty acid having 36 or 44 C atoms, isophthalic acid, terephthalic acid, and
2,6 naphthalenedicarboxylic acid.

5. The polyamide injection or extrusion molding composition according to claim 1,
wherein the lactams or α,ω-amino acids comprise 4, 6, 7, 8, 11 or 12 C atoms.

6. The polyamide injection or extrusion molding composition according to claim 1,
wherein the at least one transparent polyamide is selected from the group consisting of PA 6I/6T/6NDC/MACMI/ MACMT/MACMNDC (with NDC= naphthalenedicarboxylic acid, and MACM=bis(4-amino-3-methylcyclohexyl)methane),
PA 6I/6T/6NDC, PA MXDI/6I, PA MXDI/MXDT/6I/6T, PA 6I, PA 6I/6T, PA MXDI/12I, PA MXDI, PA MACM9, PA MACM10, PA MACM11, PA MACM12, PA MACM13, PA MACM14, PA MACM15, PA MACM16, PA MACM17, PA MACM18, PA 6-3-T, PA MACMI/12, PA MACM6/12, PA MACMT/12, PA MACMI/MACMNDC, PA MACMT/MACMNDC, PA MACMI/MACM36, PA MACMT/MACM36, PA MACMI/MACMT/12, PA 6I/MACMI/12, PA 6I/6T/ MACMI/MACMT, PA 6I/6T/MACMI/MACMT/12, and PA 6I/6T/MACMI/MACMT/MACM12/612, and
wherein the MACM optionally is completely or partially replaced by PACM and/or ω-laurolactam optionally is completely or partially replaced by ε-caprolactam and/ or α,ω-aminoundecanoic acid.

7. The polyamide injection or extrusion molding composition according to claim 1, further comprising a dye in the class of anthraquinone dyes.

8. In a transparent polyamide product or transparent polyamide molded part formed of a polyamide injection or extrusion molding composition according to claim 1,
wherein the transparent polyamide product or transparent polyamide molded part provides transmission for light having a wavelength of 400 nm of less than 20%.

9. A method of reducing deposits on production tool surfaces in the production of transparent polyamide products or transparent polyamide molded parts, wherein the method comprises:

(a) providing in a mixer or extruder a polyamide molding material comprising at least 50 wt. % polyamide consisting of at least one transparent polyamide, a mixture of transparent polyamides, or a blend of transparent polyamides with at least one partially crystalline polyamide;

(b) adding to said polyamide molding material in the mixer or extruder at least one UV absorber selected from a group consisting of 1-(4-methoxyphenyl)-3-(4-tert-butylphenyl)propane-1,3-dione and 2-(4'-diethylamino-2'-hydroxybenzoyl)benzoic acid-n-hexylester in a fraction between 0.01 and 1.0 wt. % relative to the weight of the polyamide molding material; and (c) thermoplastically processing the mixture produced of (a) and (b) by injection molding, injection compression molding, closure embossing, expansion embossing, or extrusion to produce transparent polyamide products or transparent polyamide molded parts, melts of the polyamide molding material comprising said at least one UV absorber leave no visible blooming on surfaces with which they come into contact during processing or production of transparent polyamide products or transparent polyamide molded parts.

10. A method of reducing deposits on production tool surfaces in the production of transparent polyamide products or transparent polyamide molded parts, wherein the method comprises:

(a) providing in a mixer or extruder a polyamide molding material comprising at least 50 wt. % of polyamide consisting of at least one transparent polyamide, a mixture of transparent polyamides, or a blend of transparent polyamides with at least one partially crystalline polyamide;

(b) adding to said polyamide molding material in the mixer or extruder an UV absorber which is a mixture of 1-(4-methoxyphenyl)-3-(4-tert-butylphenyl)propane-1,3-dione and 2-(4'-diethylamino-2'-hydroxybenzoyl)benzoic acid-n-hexylester; in a fraction between 0.01 and 1.0 wt. % relative to the weight of the polyamide molding material; and (c) thermoplastically processing the mixture produced of (a) and (b) by injection molding, injection compression molding, closure embossing, expansion embossing, or extrusion to produce transparent polyamide products or transparent polyamide molded parts, wherein melts of the polyamide molding material comprising said UV absorber leave no visible blooming on surfaces with which they come into contact during processing or production of transparent polyamide products or transparent polyamide molded parts.

11. The method according to claim 9, wherein the polyamide molding material comprises a further UV absorber selected from the group consisting of unchlorinated hydroxyphenylbenzotriazoles, aminohydroxybenzoyl benzoic acid esters and dibenzoylmethanes.

12. The method according to claim 9, wherein said molding material is processed by at least one of a plasticizer unit, a tool, and a cooling roller of a film extrusion system, and wherein an inner surface of said processing means which comes into contact with said molding material is thereby maintained free from any visible blooming even after 250 processing cycles.

13. The method according to claim 9, wherein the transparent polyamide product or molded part produced is selected from a group consisting of a sun lens, a corrective lens, a non-corrective lens, a lens for spectacles, a spectacle part, a protective goggles, an observation and protective window, a sight, a display, a watch-glass, an equipment casing, a lamp cover, a lens for an optical device or an optical system, a filter and a film.

14. The polyamide injection or extrusion molding composition according to claim 1, comprising a further UV absorber selected from the group consisting of unchlorinated hydroxyphenylbenzotriazoles, aminohydroxybenzoyl benzoic acid esters and dibenzoylmethanes.

15. In a transparent polyamide product or transparent polyamide molded part formed of a polyamide injection or extrusion molding composition according to claim 1, wherein the transparent polyamide product or transparent polyamide molded part provides transmission for light having a wavelength of 400 nm of less than 10%.

16. In a transparent polyamide product or transparent polyamide molded part formed of a polyamide injection or extrusion molding composition according to claim 1, wherein the transparent polyamide product or transparent polyamide molded part provides transmission for light having a wavelength of 400 nm of less than 5%.

17. In a transparent polyamide product or transparent polyamide molded part formed of a polyamide injection or extrusion molding composition according to claim 1, wherein the transparent polyamide product or transparent polyamide molded part provides transmission for light having a wavelength of 400 nm of less than 1%.

18. The polyamide injection or extrusion molding composition according to claim 1, wherein the at least one added UV absorber is present in a fraction of between 0.05 and 0.4 wt. % relative to the weight of the polyamide molding composition.

19. In a transparent polyamide product or transparent polyamide molded part formed of a polyamide injection or extrusion molding composition according to claim 1, wherein the transparent polyamide product or transparent polyamide molded part shows a light transmission of at least 75%, measured in accordance with ASTM 1003.

20. In a transparent polyamide product or transparent polyamide molded part formed of a polyamide injection or extrusion molding composition according to claim 1, wherein the transparent polyamide product or transparent polyamide molded part shows a light transmission of at least 85%, measured in accordance with ASTM 1003.

21. In a transparent polyamide product or transparent polyamide molded part formed of a polyamide injection or extrusion molding composition according to claim 1, wherein the transparent polyamide product or transparent polyamide molded part shows a light transmission of at least 90%, measured in accordance with ASTM 1003.

22. In a transparent polyamide product or transparent polyamide molded part formed of a polyamide injection or extrusion molding composition according to claim 1, wherein the transparent polyamide product or transparent polyamide molded part shows a light transmission of at least 91%, measured in accordance with ASTM 1003.

* * * * *